(12) United States Patent
Asakura et al.

(10) Patent No.: US 12,412,950 B2
(45) Date of Patent: Sep. 9, 2025

(54) SECONDARY BATTERY AND METHOD OF MANUFACTURING THE SAME

(71) Applicants: PRIME PLANET ENERGY & SOLUTIONS, INC., Tokyo (JP); TOYOTA JIDOSHA KABUSHIKI KAISHA, Toyota (JP); PRIMEARTH EV ENERGY CO., LTD., Kosai (JP)

(72) Inventors: Keisuke Asakura, Toyota (JP); Takaaki Izumoto, Toyohashi (JP); Yusuke Takashi, Toyohashi (JP)

(73) Assignees: PRIME PLANET ENERGY & SOLUTIONS, INC., Tokyo (JP); TOYOTA JIDOSHA KABUSHIKI KAISHA, Toyota (JP); PRIMEARTH EV ENERGY CO., LTD, Kosai (JP)

( * ) Notice: Subject to any disclaimer, the term of this patent is extended or adjusted under 35 U.S.C. 154(b) by 559 days.

(21) Appl. No.: 17/930,766

(22) Filed: Sep. 9, 2022

(65) Prior Publication Data
US 2023/0077326 A1  Mar. 16, 2023

(30) Foreign Application Priority Data
Sep. 15, 2021 (JP) ................. 2021-149895

(51) Int. Cl.
*H01M 50/198* (2021.01)
*H01M 10/0569* (2010.01)
(Continued)

(52) U.S. Cl.
CPC ..... *H01M 50/198* (2021.01); *H01M 10/0569* (2013.01); *H01M 10/058* (2013.01);
(Continued)

(58) Field of Classification Search
None
See application file for complete search history.

(56) References Cited

U.S. PATENT DOCUMENTS 7,758,994 B2 * 7/2010 Komori ................. H01M 50/30
429/185
2015/0364735 A1  12/2015 Kohira et al.
2017/0077486 A1  3/2017 Ishii

FOREIGN PATENT DOCUMENTS

JP  2005-140196 A  6/2005
JP  2007-149378 A  6/2007
(Continued)

*Primary Examiner* — Jonathan Crepeau
(74) *Attorney, Agent, or Firm* — Finnegan, Henderson, Farabow, Garrett, and Dunner, LLP

(57) ABSTRACT

A secondary battery with a reduced degree of increase in internal pressure over time, is provided. In a preferred embodiment, a secondary battery including: an electrode body, a battery case, an electrode terminal, and a gasket sandwiched between the battery case and the electrode terminal is provided. The secondary battery is configured such that a parameter K calculated using the following equation (1): $K = W_i/(V_r G_{H2})$ (1) (where $W_i$ represents an initial capacity (Ah) of the secondary battery, $Y_r$ represents a volume (cm³) of void in the battery case, and $G_{H2}$, represents an $H_2$ gas permeability coefficient (cm³·cm)/(cm²·s·cmHg) of the gasket at 60° C.) satisfies $0.43 \times 10^8$ or more to $0.59 \times 10^8$ or less.

6 Claims, 3 Drawing Sheets

(51) Int. Cl.
*H01M 10/058* (2010.01)
*H01M 50/103* (2021.01)
*H01M 50/188* (2021.01)
*H01M 50/30* (2021.01)

(52) U.S. Cl.
CPC ....... *H01M 50/103* (2021.01); *H01M 50/188* (2021.01); *H01M 50/394* (2021.01); *H01M 2300/004* (2013.01)

(56) References Cited

FOREIGN PATENT DOCUMENTS

| | | |
|---|---|---|
| JP | 2009-170159 A | 7/2009 |
| JP | 2015-220119 A | 12/2015 |
| JP | 6250567 B2 | 12/2017 |
| JP | 2018-181544 A | 11/2018 |
| JP | 2021-012804 A | 2/2021 |

* cited by examiner

SECONDARY BATTERY AND METHOD OF MANUFACTURING THE SAME

CROSS REFERENCE TO RELATED APPLICATIONS

The present application is based upon and claims the benefit of priority from Japanese patent application No. 2021-149895 filed on Sep. 15, 2021, and the entire disclosure of which is incorporated herein in its entirety by reference.

BACKGROUND OF THE DISCLOSURE

1. Technical Field

The present disclosure relates to a secondary battery and a method of manufacturing the same.

2. Background

Secondary batteries such as lithium-ion secondary batteries and nickel hydride batteries are widely used in various fields such as vehicles and portable terminals. This kind of secondary battery generally includes an electrode body including a positive electrode and a negative electrode, a battery case housing the electrode body, and an electrode terminal attached to the battery case and in connection with each of the electrodes of the electrode body. The secondary battery further includes a gasket sandwiched between the battery case and the electrode terminal and sealing therebetween.

In the secondary battery with such a configuration, gas may be generated inside the battery case due to charging/discharging. A technology of reducing the rapid increase in the pressure inside the case due to the gas generated is described in the following two Patent Documents, for example. The disclosure of Japanese Patent No. 6250567 proposes that when the pressure inside the sealed battery is increased due to the gas generated, an exterior can is deformed from a thin portion provided in the sealing plate of the exterior can to discharge the gas generated to the outside. On the other hand, Japanese Patent Application Publication No. 2018-181544 proposes that combined use of two gaskets having different gas permeability coefficients from each other discharges the gas generated inside the battery case to the outside.

SUMMARY OF THE INVENTION

The technologies disclosed in the above two Patent Documents are to release, when the pressure inside the secondary battery increases, the increased internal pressure to the outside of the battery case. In contrast, the present inventors have tried to reduce the degree of increase in the pressure inside the secondary battery over time.

According to the technology disclosed herein, provided is a secondary battery including: an electrode body including a positive electrode and a negative electrode; a battery case housing the electrode body; an electrode terminal attached to the battery case and in connection with the positive electrode or the negative electrode of the electrode body; and a gasket sandwiched between the battery case and the electrode terminal and sealing between the battery case and the electrode terminal. The secondary battery 10 is configured such that a parameter K calculated using the following equation (1):

$$K = Wi/(Vr \cdot G_{H2}) \tag{1}$$

(in the equation (1), Wi represents an initial capacity (Ah) of the secondary battery, Vr represents a volume ($cm^3$) of void in the battery case, and $G_{H2}$ represents an $H_2$ gas permeability coefficient ($cm^3 \cdot cm$)/($cm^2 \cdot s \cdot cmHg$) of the gasket at 60° C.) satisfies $0.43 \times 10^8$ or more to $0.59 \times 10^8$ or less.

With this configuration, the parameter K satisfying the range allows reduction in the degree of increase in the pressure inside the secondary battery over time. Therefore, the secondary battery can be used with a suitable battery performance for a long period of time.

In a preferred aspect of the secondary battery disclosed herein, the $H_2$ gas permeability coefficient $G_{H2}$ ($cm^3 \cdot cm$)/($cm^2 \cdot s \cdot cmHg$) is $35.5 \times 10^{-10}$ or more to $51.8 \times 10^{-10}$ or less, With this configuration, the effect of reducing the degree of increase in the pressure inside the secondary battery over time can be exhibited more efficiently.

In another preferred aspect, the secondary battery further includes a nonaqueous electrolyte including ethylene carbonate, ethyl methyl carbonate, and dimethyl carbonate. The secondary battery including a nonaqueous electrolyte with such a configuration can achieve the effects of the technology disclosed herein inure efficiently.

According to the technology disclosed herein, provided is a method of manufacturing a secondary battery including: an electrode body including a positive electrode and a negative electrode; a battery case housing the electrode body; an electrode terminal attached to the battery case and in connection with the positive electrode and the negative electrode of the electrode body; and a gasket sandwiched between the battery case and the electrode terminal and sealing between the battery case and the electrode terminal. This manufacturing method includes: setting a parameter K calculated using the following equation (1):

$$K = Wi/(Vr \cdot G_{H2}) \tag{1}$$

(in the equation (1), Wi represents an initial capacity (Ah) of the secondary battery, Vr represents a volume ($cm^3$) of void in the battery case, and $G_{H2}$ Represents an $H_2$ gas permeability coefficient ($cm^3 \cdot cm$)/($cm^2 \cdot s \cdot cmHg$) of the gasket at 60° C.) to satisfy $0.43 \times 10^8$ or more to $0.59 \times 10^8$ or less to construct the secondary battery.

With this configuration, the secondary battery to be manufactured is constructed by setting the parameter K to satisfy the above-described range. This allows reduction in the degree of increase in the pressure inside the secondary battery over time. Therefore, the secondary battery which can be used with a suitable battery performance for a long period of time can be provided.

In the manufacturing method, the setting is preferably performed with a gasket having the $H_2$ gas permeability coefficient $G_{H2}$ ($cm^3 \cdot cm$)/($cm^2 \cdot s \cdot cmHg$) of $35.5 \times 10^{-10}$ or more to $51.8 \times 10^{-10}$ or less selected as the gasket. With this setting, the effect of reducing the degree of increase in the pressure inside the secondary battery over time can be exhibited more efficiently.

The manufacturing method preferably farther includes: injecting a nonaqueous electrolyte including ethylene carbonate, ethyl methyl carbonate, and dimethyl carbonate. The injecting of the nonaqueous electrolyte with such a configuration allows a secondary battery which exhibits the effect of the technology disclosed herein more suitably to be provided.

DETAILED DESCRIPTION OF THE PREFERRED EMBODIMENTS

Figure 1:
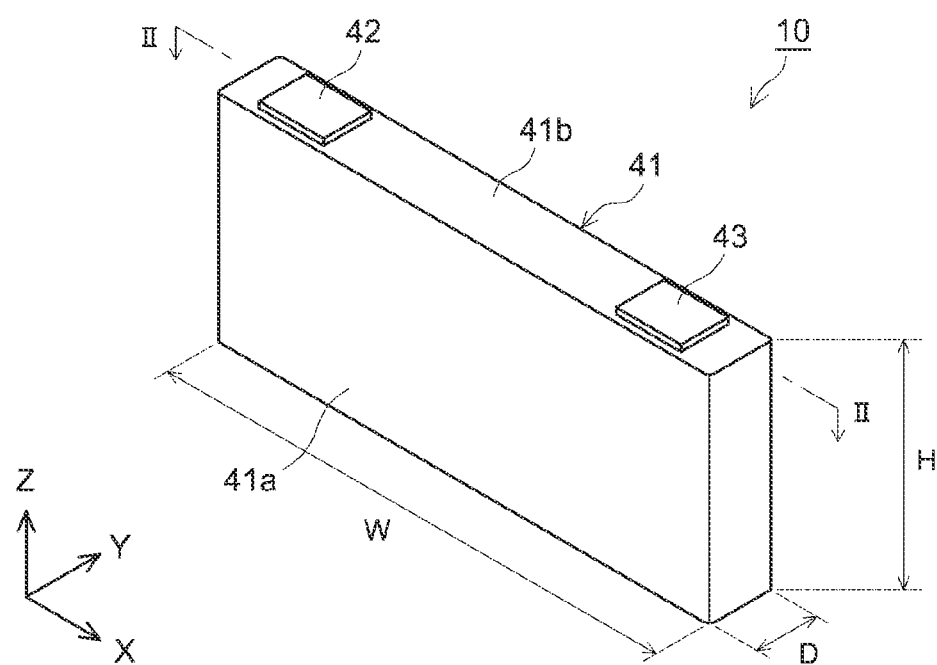
FIG. 1 is a perspective view of a secondary battery 10.

The following describes an embodiment of a secondary battery disclosed herein. The embodiment described herein is naturally not intended to limit the technology disclosed herein. Unless specifically mentioned, the technology disclosed herein is not limited to the embodiment described herein. Each drawing has been schematically illustrated and therefore may not necessarily reflect actual elements. In the drawings, the same members portions which exhibit the same action are denoted by the same reference numerals, and the duplicated descriptions may be omitted or simplified. The dimensional relation (such as length, width, or thickness) in each drawing does not reflect the actual dimensional relation. The expression "A to B" indicating a numerical range means "A or more to B or less," and also means "above A and below B" unless otherwise specified.

The "secondary battery" herein generally refers to an electricity storage device which causes a charging and discharging reaction by movement of charge carriers between a pair or electrodes (a positive electrode and a negative electrode) via an electrolyte. The "secondary battery" herein encompasses so-called secondary batteries such as a lithium-ion secondary battery, a nickel hydride battery and a nickel cadmium battery, and capacitors such as an electric double-layer capacitor. The following describes the embodiment targeting for a lithium-ion secondary battery among the secondary batteries.

<<Secondary Battery 10>>

Figure 2:
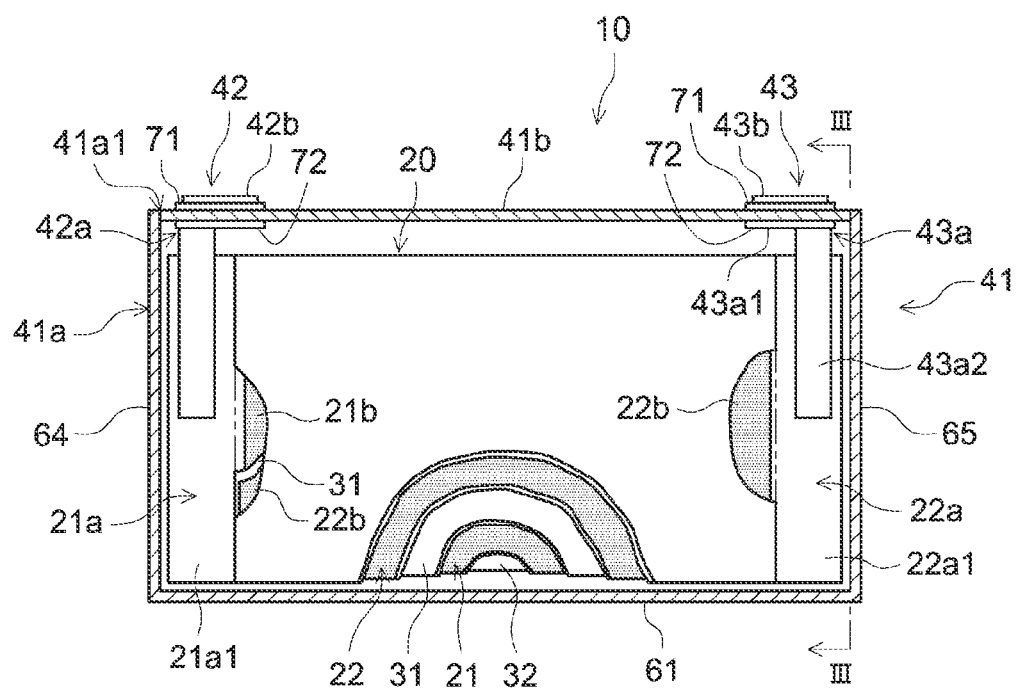
FIG. 2 is a cross-sectional view taken along line II-II of FIG. 1.
Figure 3:
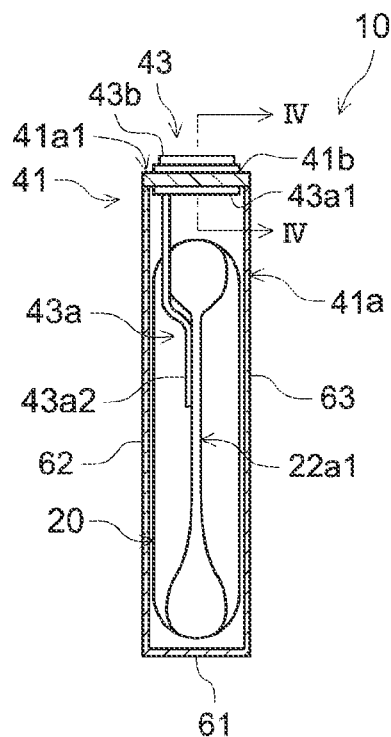
FIG. 3 is a cross-sectional view taken along line III-III of FIG. 2.

FIG. 1 is a perspective view of a secondary battery 10. FIG. 2 is a cross-sectional view taken along line II-II of FIG. 1. FIG. 2 shows the state where the inside of the secondary battery 10 is exposed along one wider surface of a substantially cuboid battery case 41. The secondary battery 10 shown in FIGS. 1 and 2 is a so-called sealed battery. FIG. 3 is a cross-sectional view taken along line III-III of FIG. 2. FIG. 3 is a schematic partial cross-sectional view of the state where the inside of the secondary battery 10 is exposed along one narrower surface of a substantially cuboid battery case 41.

As shown in FIGS. 1 to 3, the secondary battery 10 includes: an electrode body 20, a battery case 41, a positive electrode terminal 42, a negative electrode terminal 43, and a gasket 71.

The secondary battery 10 is configured such that a parameter K calculated using the following equation (1):

$$K = Wi/(VrG_{H2}) \quad (1)$$

(in the equation (1), Wi represents an initial capacity (Ah) of the secondary battery, Vr represents a volume (cm$^3$) of void in the battery case, and $G_{H2}$ represents an H$_2$ gas permeability coefficient (cm$^3$·cm)/(cm$^2$·s·cmHg) of the gasket at 60° C.) satisfies 0.43×10$^8$ or more to 0.59×10$^8$ or less. The parameter K satisfying the above-described range allows reduction in the degree of increase in the pressure inside the secondary battery over time. In the secondary battery where the parameter K satisfies the above-described range, the degree of increase in the internal pressure is reduced. Thus, it is not necessary to physically open the battery case due to the increase in the internal pressure. Therefore, the secondary battery can be used with a suitable battery performance for a long period of time. In other words, durability performance of the secondary battery can be improved.

The initial capacity Wi (Ah) in the equation (1) represents a battery capacity measured using the method described in the following Examples. In the measurement of the initial capacity Wi, the battery assembly immediately after assembling (i.e., before the electrode body is activated) is activated under the following conditions of the following Examples, to make the secondary battery be ready for use (activation process). This secondary battery is placed under the temperature condition at 25° C., and charged at a constant current of 1/3 C until the terminal voltage of the secondary battery reaches 4.1 V. Subsequently, the secondary battery is charged at a constant voltage until the current value reaches 1/50 C to fully charge the secondary battery (SOC 100%). Then, the secondary battery is discharged at a constant current of 1/3 C until the terminal voltage of the secondary battery reaches 3.0 V. At this time, the discharge capacity is measured and set as an initial capacity Wi (Ah). Note that 1 C refers to the current value which can be fully charged/discharged in one hour.

The initial capacity Wi is not particularly limited as long as the parameter K satisfies the above-described range. The initial capacity Wi can be set in accordance with the desired output of the secondary battery. The initial capacity Wi thus may be set considering the balance of the volume Vr of void in the battery case and the H$_2$ gas permeability coefficient $G_{H2}$. The initial capacity Wi may be set, as appropriate, by changing the size of the electrode body, tor example. Examples of the change in the size of the electrode body include changes in the total number of electrode bodies housed in the battery case, the size of the electrode, the coating weight of the electrode active material layer; and the thickness of the electrode active material layer. Alternatively, the constituent materials of the electrode body (e.g., the positive electrode active material, the negative electrode active material, and the electroconductive material) may be changed.

The volume Vr (cm$^3$) of void in the battery case refers to a remaining space inside the battery case and can be determined by subtracting the total volume of all components housed in the battery case from the volumetric capacity of the battery case. Specifically, the volume Vr (cm$^3$) can be calculated using the following equation (2):

$$Vr = Vt - Vs \quad (2)$$

(in the equation (2), Vt represents the volumetric capacity of the sealed space inside the battery case, and Vs represents a total of the volume V1 of a solid housed in the sealed space (e.g., the electrode body and attachment members of the electrode body) and the volume V2 of the liquid (e.g., a nonaqueous electrolyte if contained). The volume V1 of the solid is measured by the Archimedes' method (see the following Examples). The volume Vr of void in the battery case includes a pore volumetric capacity in the electrode body (i.e., the pore volumetric capacity in the electrode active material layer and the pore volumetric capacity in the separator).

The volume Vr of void in the battery case is not particularly limited as long as the parameter K satisfies the above-described range. The volume Vr of void in the battery case can be set, as appropriate, according to the desired output of the secondary battery and thus may be set considering the balance of the initial capacity Wi and the H$_2$ gas permeability coefficient $G_{H2}$. The volume Vr of void in the battery case may be set, as appropriate, by changing the size of the electrode body, for example. Examples of the change in the size of the electrode body include changes in the total number of electrode bodies housed in the battery case, the size of the electrode, the coating weight of the electrode active material layer, and the thickness of the electrode active material layer. Alternatively, the constituent materials of the electrode body (e.g., the positive electrode active material, the negative electrode active material, and the electroconductive material) may be changed.

Although not particularly limited thereto, the ratio (Vr/Vt) between the volume Vr of void in the battery case and the volumetric capacity Vt of the sealed space in the battery case can be set to approximately 0.1 to approximately 0.3 (e.g., 0.14 to 0.25).

The $H_2$ gas permeability coefficient $G_{H2}$ $(cm^3 \cdot cm)/(cm^2 \cdot s \cdot cmHg)$ is measured in accordance with HS K 7126-1 (differential pressure method). Specific procedures, measurement conditions, and measurement devices are described in detail in the following Examples.

The $H_2$ gas permeability coefficient $G_{H2}$ is not particularly limited as long as the parameter K satisfies the above-described range. The $H_2$ gas permeability coefficient $G_{H2}$ may be set in accordance with the desired output of the secondary battery considering the balance of the initial capacity Wi and the volume Vr of void in the battery case. For example, in order to increase the output of the secondary battery, the initial capacity Wi may be increased, and the volume Vr of void in the battery case may be reduced. At this time, selection of a gasket with a larger $H_2$ gas permeability coefficient $G_{H2}$ can make the parameter K in the suitable range. In terms of reducing the degree of increase in the pressure inside the secondary battery over time, the $H_2$ gas permeability coefficient $G_{H2}$ may be set to the range of appropriately $20.0 \times 10^{-10}$ $(cm^3 \cdot cm)/(cm^2 \cdot s \cdot cmHg)$ to approximately $75.0 \times 10^{-10}$ $(cm^3 \cdot cm)/(cm^2 \cdot s \cdot cmHg)$. The $H_2$ gas permeability coefficient $G_{H2}$ is set to preferably $35.5 \times 10^{-10}$ $(cm^3 \cdot cm)/(cm^2 \cdot s \cdot cmHg)$ or more to $51.8 \times 10^{-10}$ $(cm^3 \cdot cm)/(cm^2 \cdot s \cdot cmHg)$ or less. As will be described in detail below, the $H_2$ gas permeability coefficient $G_{H2}$ may be set, as appropriate, by changing the constituent material and the like of the gasket.

The size (dimensions) of the secondary battery 10 is not particularly limited. The width W (the length in the width direction X, see FIG. 1) of the secondary battery 10 may be, for example, 70 mm or more, 100 mm or more, 150 mm or more, or 200 mm or more. Alternatively, the width W may be, for example, 300 mm or less, 250 mm or less, 200 mm or less, or 150 mm or less. The length D of the secondary battery 10 in the depth direction Y (see FIG. 1) may be, for example, 5 mm or more, 7 mm or more, 10 mm or more, or 20 mm or more. Alternatively, the length D may be, for example, 30 mm or less, 25 mm or less, 20 mm or less, or 15 mm or less. The height H (the length in the height direction Z, see FIG. 1) of the secondary battery 10 may be, for example, 40 mm or more, 50 mm or more, 60 mm or more, or 70 mm or more. Alternatively, the height H may be, for example, 80 mm or less, 75 mm or less, 70 mm or less, or 65 mm or less.

<Electrode Body 20>

The electrode body 20 is housed in the battery case 41 with being covered with an insulation film (not shown) or the like. The number of electrode bodies 20 in the secondary battery 10 is not particularly limited, and may be one, or multiple (two, three, or four or more). In the present embodiment, the secondary battery 10 houses one electrode body 20. The electrode body 20 includes a positive electrode (a positive electrode sheet 21 in FIG. 2), a negative electrode (a negative electrode sheet 22 in FIG. 2), and separator sheets 31 and 32 as a separator. The positive electrode sheet 21, the separator sheets 31 and 32, and the negative electrode sheet 22 are each a long strip-like member.

In the positive electrode sheet 21, positive electrode active material layers 21b are formed on both surfaces of a positive electrode current collector foil 21a (e.g., an aluminum foil) having a predetermined width and a predetermined thickness except for a portion 21a1 where the positive electrode current collector foil 21a is not formed and which is set to have a certain width at one end in the width direction. Examples of the positive electrode active material included in the positive electrode active material layer 21b include lithium transition metal oxide (such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$) and lithium transition metal phosphate compound (such as $LiFePO_4$). The positive electrode active material layer 21b may contain a component such as an electroconductive material and a binder, besides the active material. The electroconductive material used can be, for example, carbon black such as acetylene black (AB) and other carbon materials (such as graphite). The binder used may be, for example, polyvinylidene fluoride (PvdF).

In the negative electrode sheet 22, negative electrode active material layers 22b containing a negative electrode active material are formed on both surfaces of a negative electrode current collector foil 22a (here, a copper foil) having a predetermined width and a predetermined thickness except for a portion 22a1 where the negative electrode current collector foil 22a is not formed and which is set to have a certain width at one end in the width direction. Examples of the negative electrode active material contained in the negative electrode active material layer 22b include carbon materials such as graphite, hard carbon, and soft carbon. The negative electrode active material layer 22b may further contain a component such as a binder and a thickener, besides the active material. Examples of the binder used include styrene-butadiene rubber (SBR). Examples of the thickener used include carboxymethyl cellulose (CMC).

The separator sheets 31 and 32 used may each be a porous resin sheets through which an electrolyte with a desired heat resistance can pass. Examples of the separator sheets 31 and 32 include a porous sheet (films) made of resin such as polyethylene (PE), polypropylene (PP), polyester, cellulose, and polyamide. Such a porous sheet may have a monolayer structure, or a lamination structure of two or more layers (e.g., a three-layer structure where PP layers are stacked on both surfaces of a PE layer). The surface of the separator sheets 31 and 32 may be provided with a heat-resistant layer (HRL) made of ceramic particles.

The negative electrode active material layer 22b is formed to have a width greater than the width of the positive electrode active material layer 21b, for example. The widths of the separator sheets 31 and 32 are greater than that of the negative electrode active material layer 22b. The portion 21a1 where the positive electrode current collector foil 21a is not formed and the portion 22a1 where the negative electrode current collector foil 22a is not formed are disposed to face each other in the width direction. The positive electrode sheet 21, the separator sheet 31, a negative electrode sheet 22, and a separator sheet 32 are aligned in the length direction, and are wound up in turn on top of each other. The negative electrode active material layer 22b covers the positive electrode active material layer 21b with the separator sheets 31 and 32 interposed therebetween. The negative electrode active material layer 22b is covered with the separator sheets 31 and 32. The portion 21a1 where the positive electrode current collector foil 21a is not formed protrudes from one side of the separator sheets 31 and 32 in the width direction. The portion 22a1 where the negative electrode current collector foil 22a is not formed protrudes from the separator sheets 31 and 32 the other side in the width direction.

As shown in FIG. 2, the above-mentioned electrode body 20 is a flat along one plane including the winding axis so as to be housed in the case body 41a of the battery case 41. The portion 21a1 where the positive electrode current collector foil 21a is not formed is disposed on one side, and the portion 22a1 where the negative electrode current collector foil 22a is not formed is disposed on the other side, of the electrode body 20 along the winding axis.

<Battery Case 41>

As shown in FIG. 2, the battery case 41 houses the electrode body 20. As shown in FIGS. 1 and 2, the battery case 41 includes a case body 41a having an opening in one side surface and a substantially cuboid square shape, and a lid 41b attached to the opening. In this embodiment, the case body 41a and the lid 41b are formed of aluminum or an aluminum alloy mainly containing aluminum in order to reduce weight and ensure the required rigidity.

<Case Body 41a>

The case body 41a has an opening in one side surface and a substantially cuboid square shape. The case body 41a has a substantially rectangular bottom surface 61, a pair of wider surfaces 62 and 63 (see FIG. 3), and a pair of narrower surfaces 64 and 65. The pair of wider surfaces 62 and 63 are standing from the longer side of the bottom surface 61. The pair of narrower surfaces 64 and 65 are standing from the shorter side of the bottom surface 61. In one side surface of the case body 41a, an opening 41a1 surrounded by the pair of wider surfaces 62 and 63 and the pair of narrower surfaces 64 and 65 is formed.

<Lid 41b>

The lid 41b is attached to the opening 41a1 in the case body 41a surrounded by longer sides of the pair of wider surfaces 62 and 63 (see FIG. 3) and shorter sides of the pair of narrower surfaces 64 and 65. The outer edge of the lid 41b is bonded to the edge of the opening 41a1 of the case body 41a. Such bonding may be performed, for example, by continuous welding without gaps. Such welding can be achieved, for example, by laser welding. Although detailed illustrations are omitted, the lid 41b can be provided with a liquid injection hole and a gas discharge valve. The liquid injection hole is for injecting a nonaqueous electrolyte after bonding the lid 41b to the case body 41a. The liquid injection hole is sealed with a sealing member. The gas discharge valve is a thin portion configured to be broken and to discharge gas inside the battery case 41 to the outside when the pressure inside the battery case 41 exceeds a predetermined value.

The positive electrode terminal 42 and the negative electrode terminal 43 are attached to the battery case 41 (the lid 41b in this embodiment), and are in connection with the respective electrodes of the electrode body 20. The positive electrode terminal 42 includes an inner terminal 42a and an outer terminal 42b. The negative electrode terminal 43 includes an inner terminal 43a and an outer terminal 43b. The inner terminals 42a and 43a are attached to the inside of the lid 41b via an insulator 72. The outer terminals 42b and 43b are attached to the outside of the lid 41b via a gasket 71. The inner terminals 42a and 43a extend into the case body 41a. The inner terminal 42a of the positive electrode is in connection with the portion where the positive electrode current collector foil 21a is not formed. The inner terminal 43a of the negative electrode is in connection with a portion 22a1 where the negative electrode current collector foil 22a is not formed.

As shown in FIG. 2, the portion 21a1 where the positive electrode current collector foil 21a of the electrode body 20 is not firmed and the portion 22a1 where the negative electrode current collector foil 22a of the electrode body 20 is not formed are attached respectively to the inner terminals 42a and 43a attached to both sides of the lid 41b in the longitudinal direction. The electrode body 20 is housed in the battery case 41 with being attached to the inner terminals 42a and 43a attached to the lid 41b.

Although not shown in the drawings, the secondary battery 10 further includes a nonaqueous electrolyte. In other words, the secondary battery 10 may be a nonaqueous electrolyte secondary battery including a nonaqueous electrolyte. The battery case 41 may house a nonaqueous electrolyte together with the electrode body 20. Gas (e.g., carbon dioxide) may generate inside the battery case when the nonaqueous electrolyte secondary battery is charged/discharged, overcharged, or stored in a high-temperature environment, thereby increasing the pressure inside the battery. In other words, the effects of the technology disclosed herein may be applied particularly preferably to the aspect where the secondary battery 10 includes a nonaqueous electrolyte. Although not particularly limited thereto, the nonaqueous electrolyte used may be obtained by dissolving a supporting electrolyte in a nonaqueous solvent. Examples of the nonaqueous solvent include carbonate-based solvents such as ethylene carbonate, dimethyl carbonate, and ethyl methyl carbonate. Such nonaqueous electrolytes may be used alone or in combination of two or more of them. Examples of the supporting electrolyte include fluorine-containing lithium salts such as $LiPF_6$. The nonaqueous electrolyte may contain various additives such as a film forming agent.

Figure 4:
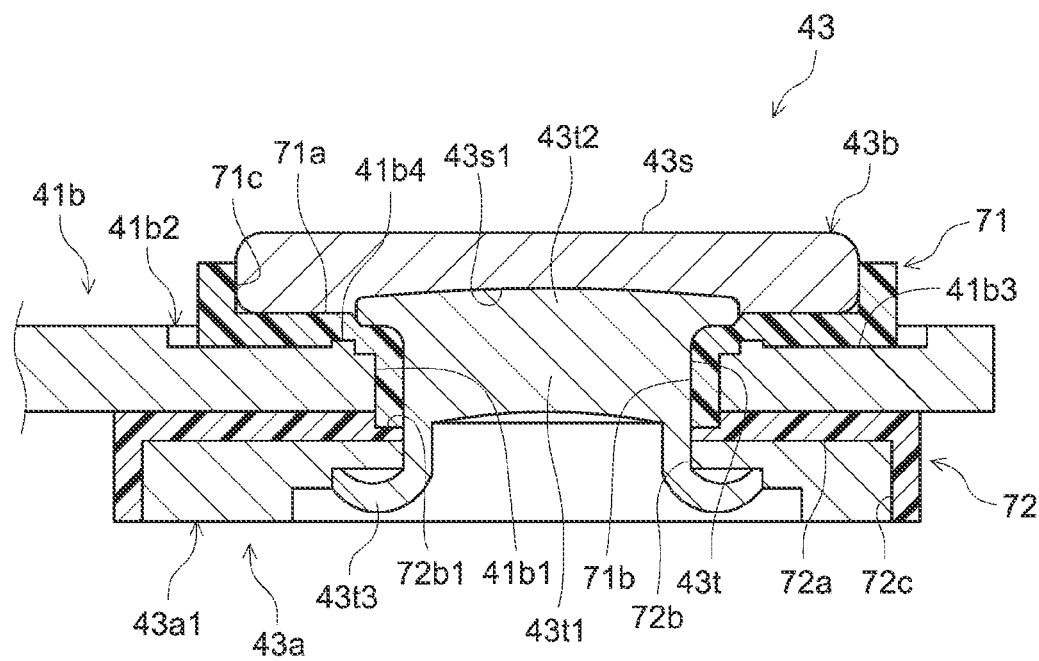
FIG. 4 is a cross-sectional view taken along line IV-IV of FIG. 3.

FIG. 4 is a cross-sectional view taken along line IV-IV of FIG. 3. FIG. 4 shows the cross section of a portion where the negative electrode terminal 43 is attached to the lid 41b. As shown in FIG. 4, the lid 41b has an attachment hole 41b1 attached to the outer terminal 43b of the negative electrode. The attachment hole 41b1 penetrates the lid 41b at a predetermined position of the lid 41b. The inner terminal 43a and the outer terminal 43b of the negative electrode are attached to the attachment hole 41b1 of the lid 41b with a gasket 71 and an insulator 72 interposed therebetween. The outside of the attachment hole 41b1 is provided with a step 41b2 for attaching the gasket 71 to the periphery of the attachment hole 41b1. The step 41b2 is provided with a seat surface 41b3 on which the gasket 71 is disposed. The seat surface 41b3 is provided with a projection 41b4 for positioning the gasket 71.

The outer terminal 43b of the negative electrode includes a head 43s and a shaft 43t, as shown in FIG. 4. In the embodiment shown in FIG. 4, the head 43s and the shall 43t are made of different members from each other. The head 43s is a portion disposed outside the lid 41b. The head 43s is a substantially flat plate-like portion larger than the attachment hole 41b1 and has a recess 43s1. The shaft 43t is a portion attached to the attachment hole 41b1 via the gasket 71. The shaft 43t protrudes downward from a substantially center portion of the head 43s. The shaft 43t has a shaft body 43t1 and a flange portion 43t2 extending from one end of the shaft body 43t1 in the outer diameter direction. The flange portion 43t2 has a substantially circular shape, and fitted in the recess 43s1 of the head 43s. The shaft body 43t1 is further provided with a crimping portion 43t3 to be crimped in the inner terminal 43a on the side opposite to the side on which the flange portion 43t2 is provided. As shown in FIG. 4, the crimping portion 43t3 is crimped in the lid 41b by the inner terminal 43a of the negative electrode. The crimping portion 43t3 extends from the shaft body 43t1, inserted into the lid 41b, and then bent and crimped by the inner terminal 43a of the negative electrode.

Although not particularly limited thereto, the head 43s and the shaft 43t may be made of different metals from each other in terms of connectivity with the busbar. As a result, when the busbar is made of aluminum, the metal configuring the head 43s may be aluminum or an aluminum alloy, and the metal configuring the shaft 43t may be copper or a copper alloy.

<Gasket 71>

The gasket 71 is a member sandwiched between the battery case 41 and the electrode terminal (here, the negative electrode terminal 43) and sealing between the battery case 41 and the electrode terminal. Specifically, as shown in FIG. 4, the gasket 71 is attached to the attachment hole 41b1 and the seat surface 41b3 of the lid 41b. In this embodiment, the gasket 71 includes a seat portion 71a, a boss 71b, and a side wall 71c. The seat portion 71a is a portion attached to the seat surface 41b3 provided on the outer surface around the attachment hole 41b1 of the lid 41b. The seat portion 71a has a substantially flat surface to match the seat surface 41b3. The seat portion 71a has a recess corresponding to the projection 41b4 of the seat surface 41b3. The boss 71b protrudes from the bottom surface of the seat portion 71a. The boss 71b has an outer shape along the inner surface of the attachment hole 41b1 so as to be attached to the attachment hole 41b1 of the lid 41b. The inner surface of the boss 71b forms an attachment hole to which the shaft 43t of the outer terminal 43b is attached. The side wall 71c is standing from the periphery of the seat portion 71a. The head 43s of the outer terminal 43b is attached to the site surrounded by the side wall 71c of the gasket 71.

The gasket 71 is disposed between the lid 41b and the outer terminal 43b, and ensures insulation between the lid 41b and the outer terminal 43b. The gasket 71 ensures the airtightness of the attachment hole 41b1 in the lid 41b. In light of this, resin materials with excellent chemical resistance and weather resistance may be suitably used. Examples of the resin material include fluorine resins such as perfluoroalkoxy alkane (PFA) (e.g., a copolymer of tetrafluoroethylene and perfluoroalkoxyethylene (e.g., perfluoroalkylvinylether) (e.g., tetrafluoroethylene-perfluoroalkylvinylether copolymer, polytetrafluoroethylene (PTFE), a perfluoroethylene propene copolymer (FEP), ethylene-tetrafluoroethylene copolymer (ETFE), and polychlorotrifluoroethylene (PCTFE); and polyolefin resins such as polypropylene (PP) and polyethylene (PE). The kind of the resin material configuring the gasket 71 may be selected such that, for example, the $H_2$ gas permeability coefficient $G_{H2}$ satisfies the above-described range.

The method of setting the gas permeability coefficient $G_{H2}$ to a desired numerical value may be changing of the resin material constituting the gasket 71 or changing, as appropriate, the settings of the specific gravity and the mixing ratio of additives such as a filler material.

<Insulator 72>

The insulator 72 is a member that is attached to the inside of the lid 41b around the attachment hole 41b1 of the lid 41b. The insulator 72 includes a base 72a, a hole 72b, and a side wall 72c. The base 72a is a portion disposed along the inner surface of the lid 41b. In the present embodiment, the base 72a is a substantially flat plate-like portion. The base 72a is disposed along the inner surface of the lid 41b, and is large enough not to protrude from the lid 41b so as to be housed in the case body 41a. The hole 72b is provided to correspond to the inner surface of the boss 71b of the gasket 71. In the present embodiment, the hole 72b is provided in the substantially center portion of the base 72a. On the side surface facing the inner surface of the lid 41b, a recessed step 72b1 is provided around the hole 72b. The tip of the boss 71b of the gasket 71 attached to the attachment hole 41b1 is fitted in the step 72b1 so that the step 72b1 does not interfere. The side wall 72c is standing from the outer edge of the base 72a. A basal portion 43a1 provided at one end of the inner terminal 43a of the negative electrode is fitted to the base 72a. The insulator 72 suitably has an appropriate chemical resistance because of being disposed inside the battery case 41. The constituent material of the insulator 72 used may be, for example, poly phenylene sulfide resin (PPS). The material for the insulator 72 is not limited to PPS.

The inner terminal 43a of the negative electrode includes a basal portion 43a1 and a connection piece 43a2 (see FIGS. 2 and 3). The basal portion 43a1 is a portion attached to the base 72a of the insulator 72. In this embodiment, the basal portion 43a1 has a shape corresponding to the inner side of the side wall 72c around the base 72a of the insulator 72. The connection piece 43a2 extends from one end of the basal portion 43a1 into the case body 41a to be connected to the portion 22a1 of the electrode body 20 where the negative electrode is not formed (see FIGS. 2 and 3).

In this embodiment, the gasket 71 is attached in the outside of the lid 41b while the boss 71b is attached to the attachment hole 41b1. The outer terminal 43b is attached to the gasket 71. In this case, the shaft 43t of the outer terminal 43b is inserted into the boss 71b of the gasket 71, and the head 43s of the outer terminal 43b is disposed on the seat portion 71a of the gasket 71. The insulator 72 and the negative electrode terminal 43 are attached to the inside of the lid 41b. As shown in FIG. 4, the crimping portion 43t3 of the outer terminal 43b is bent and crimped to the basal portion 43a1 of the negative electrode terminal 43. The crimping portion 43t3 of the outer terminal 43b and the basal portion 43a1 of the negative electrode terminal 43 may be partially bonded to each other by welding or metal bonding to improve electroconductivity.

As mentioned above, the attachment of the electrode terminal to the lid 41b is described using the negative electrode terminal 43 as an example. For the positive electrode, as an outer terminal 42b, an outer terminal having a head and a shaft made of aluminum or an aluminum alloy may be used. The other structure is basically the same as that on the negative electrode side. Thus, the detailed description is omitted here.

When gaskets of different compositions are used for the positive and negative electrodes sides, the arithmetic means of the $H_2$ gas permeability coefficient $G_{H2p}$ of the gasket on the positive electrode side at 60° C. and the $H_2$ gas permeability coefficient $G_{H2n}$ of the gasket on the negative electrode side at 60° C. can be the $H_2$ gas permeability coefficient $G_{H2}$ in the equation (1).

That is, in the above case, the $H_2$ gas permeability coefficient $G_{H2}$ can be calculated using the following equation (3):

$$H_2 \text{ gas permeability coefficient } G_{H2} = (H_2 \text{ gas permeability coefficient } G_{H2p} + H_2 \text{ gas permeability coefficient } G_{H2n})/2 \quad (3)$$

<<Method of Manufacturing Secondary Battery 10>>

The method of manufacturing the secondary, battery 10 according to an embodiment will be described below with reference to FIGS. 1 to 4, as appropriate. In the method of manufacturing the secondary battery 10, first, an electrode body 20, a battery case 41, a positive electrode terminal 42, a negative electrode terminal 43, and a gasket 71 are provided. Then, the secondary battery 10 is constructed such that a parameter K calculated using the following equation (1):

$$K = Wi/(Vr G_{H2}) \tag{1}$$

(in the equation (1), Wi represents an initial capacity (Ah) of the secondary battery, Vr represents a volume ($cm^3$) of void in the battery case, and $G_{H2}$ represents an $H_2$ gas permeability coefficient ($cm^3 \cdot cm$)/($cm^2 \cdot s \cdot cmHg$) of the gasket at 60° C.) is set to satisfy $0.43 \times 10^8$ or more to $0.59 \times 10^8$ or less. The manufacturing method described above allows a secondary battery where the degree of increase in the internal pressure over time is reduced and the durability performance is improved to be provided.

The parameter K can be set by setting, as appropriate, the initial capacity Wi of the secondary battery, the volume Vr of void in the battery case, and the $H_2$ gas permeability coefficient $G_{H2}$ of the gasket at 60° C. as described above. This allows reduction in the degree of increase in the pressure inside the secondary battery over time and improvement of the durability performance. In addition to such effects, effects such as improvement in the output of the secondary battery and the like can be realized by setting the elements.

The method of manufacturing the secondary battery 10 includes, as an example, an electrode body provision step, an electrode body attachment step, an electrode body housing step, a liquid injecting step, and a sealing step. In the electrode body provision step, an electrode body 20 is provided. In this step, the electrode body 20 designed such that the parameter K is in the suitable range is provided. Specifically, an electrode body set to have an initial capacity Wi which can realize the desired output by changing, as appropriate, the size of the electrode body and the constituent materials of the electrode body is provided. Except for this point, the method of producing the electrode body 20 itself can be any well-known method.

In the electrode body attachment step, an electrode terminal is attached to the electrode body 20. Specifically, for example, first, a lid 41b of a battery case 41 with a positive electrode terminal 42 and a negative electrode terminal 43 attached is provided. Subsequently, the electrode body 20 is attached to an integrated body of such an lid 41b and the electrode terminal. The portion of the electrode body 20 to which the electrode terminal is attached is as mentioned above. Thus, the description thereof is omitted herein. The gasket having an $H_2$ gas permeability coefficient $G_{H2}$ in the specific range, selected in the setting above, may be used.

In the electrode body housing step, the electrode body 20 connected to the lid 41b via the electrode terminal is housed in the case body 41a, and the lid 41b and the case body 41a are bonded to each other. Subsequently, the nonaqueous electrolyte is injected from the liquid injection hole provided in the lid 41b (the liquid injecting step). Then, the liquid injection hole is sealed with a sealing member (the sealing step), and an activation process is conducted under predetermined conditions. Thus, a secondary battery 10 which is ready to use can be produced.

The secondary battery 10 can be used in various applications. Suitable applications include power sources for driving, to be mounted on vehicles such as battery electric vehicles (BEVs), hybrid electric vehicles (HEVs), and plug in hybrid electric vehicles (PHEVs). Further, the secondary battery 10 can be used as a storage battery such as a small power storage device. Typically, the multiple secondary batteries 10 used may be connected in series and/or parallel to be in an assembled battery.

In the embodiment, a secondary battery 10 including a flat wound electrode body as an example of an electrode body 20 has been described above. However, the secondary battery disclosed herein can be configured as a secondary battery including a laminated electrode assembly (i.e., an electrode assembly where multiple positive electrodes and multiple negative electrodes are stacked alternately). The secondary battery may be configured as a cylindrical secondary battery, a laminated secondary battery, or the like.

EXAMPLES

Some examples regarding the present disclosure will be described below. However, it is not intended that the present disclosure is limited to such examples.

<Provision of Gasket>

Two kinds of gaskets including a gasket R and a gasket S were provided to produce a secondary battery for evaluation.

—Gasket R—

Trade name and distributor: AP230 (Daikin Industries, Ltd.)

Material: PFA (a copolymer of tetrafluoroethylene and tetrafluoroethylene-perfluoroalkylvinylether)

Specific gravity: 2.14

—Gasket S—

Trade name and distributor: NP-20 (Daikin Industries, Ltd.)

Material: FEP (a copolymer of tetrafluoroethylene and hexafluoropropylene)

Specific gravity: 2.15

<Measurement of $H_2$ Gas Permeability Coefficient $G_{H2}$>

For measurement of the $H_2$ gas permeability coefficient $G_{H2}$, a disk-shaped test pieces (n=3) with a thickness of 0.2 mm and a diameter of 70 mm to 150 mm were provided by using the gasket R and the gasket S. By using these test pieces, the $H_2$ gas permeability coefficient $G_{H2}$ ($cm^3 \cdot cm$)/($cm^2 \cdot s \cdot cmHg$) of each test piece in the thickness direction was measured in accordance with HS K7126-1 "Plastics—Film and sheeting—Determination of gas-transmission rate Part 1: Differential-pressure methods." As a measurement device, a gas-transmission tester "MT-C3" manufactured by Toyo Seiki Seisaku-sho, Ltd. was used. The measurement conditions were as follows: a measurement temperature: 60° C., the transmission cross section of the measurement cell: 38.46 $cm^2$, the differential pressure: 800 mmHgG to 850 mmHgG on the primary side, and 0 mmHgG on the detection side. The measurement was performed in a room at 25° C. The measurement was conducted on three test pieces, and the arithmetic means of the obtained measurement values was used as the $H_2$ gas permeability coefficient $G_{H2}$ of each of the gasket R and the gasket S. The $H_2$ gas permeability coefficient $G_{H2}$ of the gasket R was $35.5 \times 10^{-10}$ ($cm^3 \cdot cm$)/($cm^2 \cdot s \cdot cmHg$), and the $H_2$ gas permeability coefficient $G_{H2}$ of the gasket S was $51.8 \times 10^{-10}$ ($cm^3 \cdot cm$)/($cm^2 \cdot s \cdot cmHg$).

Example 1

<Production of Secondary Battery for Evaluation>

$LiNi_{1/3}Co_{1/3}Mn_{1/3}O_2$ (LNCM) as a positive electrode active material powder, acetylene black (AB) as an electroconductive material, and polyvinylidene fluoride (PVdF) as a binder were mixed at a mass ratio of LNCM:AB:

PVdF=90:8:2 in N-methylpyrrolidone (NMP). Thus, a slurry for forming a positive electrode active material layer was prepared. The slurry was applied to both sides of a long aluminum foil (the length in the longitudinal direction: 360 cm, the length in the lateral direction: 105 cm) in strip form (the coating amount: 11.0 mg/cm$^2$), and then dried and pressed to produce a positive electrode sheet.

In ion-exchange water, natural graphite (C) as a negative electrode active material, styrene-butadiene rubber (SBR) as a binder, and carboxymethyl cellulose (CMC) as a thickener were mixed at a mass ratio C:CBR:CMC=98:1:1. Thus, a slurry for forming a negative electrode active material layer was prepared. The slurry was applied to both sides of a long copper foil (the length in the longitudinal direction: 370 cm, the length in the lateral direction: 107 cm) in strip form (the coating amount: 7.0 mg/cm$^2$), and then dried and pressed to produce a negative electrode sheet.

As a separator, two porous polyolefin sheets having a three-layer structure of PP/PE/PE were provided. The positive and negative electrode sheets produced as described above and two separator sheets provided above were stacked, then wound, and thereafter pressed from the side to abduct them to produce a flat wound electrode body. Subsequently, positive and negative electrode terminals and a lid of the battery case are attached to this electrode body, which were then housed in a case body. The lid and the case body were sealed by laser welding, Here, the gasket R was used for the attachment between the lid and the electrode terminals. As the battery case, a square battery case A having a liquid injection hole for the nonaqueous electrolyte was used. As dimensions of the battery case A, the width W was 120 mm, the length D was 12.6 mm, and the height H was 65 mm (see FIG. 1).

Subsequently, a volume V2 (cm) of the nonaqueous electrolyte was injected through the liquid injection hole of the battery case, and the liquid injection hole was hermetically sealed. As the nonaqueous electrolyte, one obtained by dissolving $LiPF_6$ with a concentration of 1.0 mol/L as a supporting electrolyte in a mixed solvent containing ethylene carbonate (EC), dimethyl carbonate (DMC), and ethyl methyl carbonate (EMC) at a volume ratio EC:EMC:DMC=3:4:3 was provided.

The secondary battery assembly after the injection of the nonaqueous electrolyte was stabilized in an environment at 25° C. and subjected to activation process. As the activation process, the secondary battery assembly was charged at a constant current up to 4.1 V at 25° C., and then subjected to aging process for 20 hours in an environment at 60° C. In this manner, a secondary battery for evaluation according to Example 1 was prepared.

<Measurement of Initial Capacity Wi>

After the activation process, the initial capacity Wi of the secondary battery for evaluation was measured. Specifically, the secondary battery for evaluation after the activation process was placed under the temperature condition at 25° C., and charged at a constant current of 1/3 C until the terminal voltage of the secondary battery reached 4.1 V. Subsequently, the secondary battery for evaluation was charged at a constant voltage until the current value reached 1/50 C to fully charge the secondary battery (SOC 100%). Then, the secondary battery for evaluation was discharged at a constant current of 1/3 C until the terminal voltage of the secondary battery reached 3.0 V. At this time, the discharge capacity was measured and set as an initial capacity Wi (Ah), The results are shown in the corresponding column in Table 1.

<Measurement of Volume Vr of Void in Battery Case>

The volume Vr of void in the battery case was measured by the Archimedes' method by using the secondary battery assembly after sealing between the lid and the case body and before injection of the nonaqueous electrolyte. Specifically, the nonaqueous electrolyte was injected to the secondary battery assembly to fill the battery case, and the volume of the nonaqueous electrolyte injected was recorded. A value obtained by subtracting this volume from the volumetric capacity Vt of the battery case was set as a volume V1 of the solid housed in the sealed space of the battery case. Then, the volume Vr of void in the battery case was calculated using the following equation (4):

$$Vr=Vt-(V1+V2) \qquad (4)$$

V2 represents, as described above, the volume of the nonaqueous electrolyte. The results are shown in the corresponding column in Table 1.

<Calculation of Parameter K>

A parameter K was calculated using the equation (1) based on the initial capacity Wi, the volume Vr of void in the battery case, and the $H_2$ gas permeability coefficient $G_{H2}$ obtained as described above. The results are shown in the corresponding column in Table 1.

Examples 2, 3, and 8 to 10

Secondary batteries for test according to the Examples were prepared in the same manner as in Example 1 except that the configuration of the electrode body (the coating weights of the slurries for forming electrode active material layers, the thicknesses of the electrode active material layers, the lengths of the aluminum foil and the copper foil) was changed, as appropriate, and the initial capacity Wi and the volume Vr of void in the battery case were adjusted (calculated by using the same method as in Example 1, see the corresponding column in Table 1), and the parameter K was set to a value described in the corresponding column in Table 1.

Examples 4, 5, 7, 12, and 13

Gasket S was used instead of gasket R. Secondary batteries for test according to the Examples were prepared in the same manner as in Example 1 except that the configuration of the electrode body (the coating weights of the slurries for forming electrode active material layers, the thicknesses of the electrode active material layers, the lengths of the aluminum foil and the copper foil) was changed, as appropriate, and the initial capacity Wi and the volume Vr of void in the battery case were adjusted (calculated by using the same method as in Example 1, see the corresponding column in Table 1), and the parameter K was set to a value described in the corresponding column in Table 1.

Examples 6 and 11

A battery case B was used instead of the battery case A. Secondary batteries for test according to the Examples were prepared in the same manner as in Example 1 except that the configuration of the electrode body (the coating weights of the slurries for forming electrode active material layers, the thicknesses of the electrode active material layers, the lengths of the aluminum foil and the copper foil) was chanced, as appropriate, and the initial capacity Wi and the volume Vr of void in the battery case were adjusted (calculated by using the same method as in Example 1, see the corresponding column in Table 1), and the parameter K was set to a value described in the corresponding column in Table 1. As dimensions of the battery case B, the width W was 137 mm, the length D was 13.3 mm, and the height H was 63.2 mm (see FIG. 1).

<Measurement of Internal Pressure Increase Slope S>

The SOC of each of the secondary batteries for test according to the Examples was adjusted to 91%. The projection of a differential pressure gauge (PRESSURE GAUGE manufacturer: Limited company Nagoya Seiki Seisakusyo) was inserted into each battery case to measure the internal pressure P1 (MPa) before storage. Then, the secondary battery for test was placed in a thermostatic chamber set at 60° C. and stored for 120 days. After 120 days, the internal pressure P2 (MPa) after storage was measured using the differential pressure gauge. Thereafter, the internal pressure increase slope S was calculated using the following equation (5):

$$S=(P2-P1)/\sqrt{day} \quad (5)$$

The results are shown in the corresponding column in Table 1. In this example, when the internal pressure increase slope S calculated as described above was $0.25 \times 10^{-2}$ (MPa/√day) or less, the degree of increase in the pressure inside the secondary battery for evaluation over time was evaluated as being sufficiently low.

<Storage Test>

The SOC of each of the secondary batteries for test according to the Examples was adjusted to 80%, the secondary battery was then subjected to a storage test of storing it for a predetermined period of time under the temperature condition at 75° C., and thereafter the capacity Wc of the secondary battery for evaluation (the capacity after storage) was measured. Then, a value determined using the following equation (6):

$$\text{Capacity retention rate (\%)} = (Wc/Wi) \times 100 \quad (6)$$

was set as a capacity retention rate (%) of each Example. The results are shown in the corresponding column in Table 1. In this example, when the capacity retention rate calculated as described above was 98.0% or more, the secondary battery for evaluation was evaluated as having high durability performance.

Figure 5:
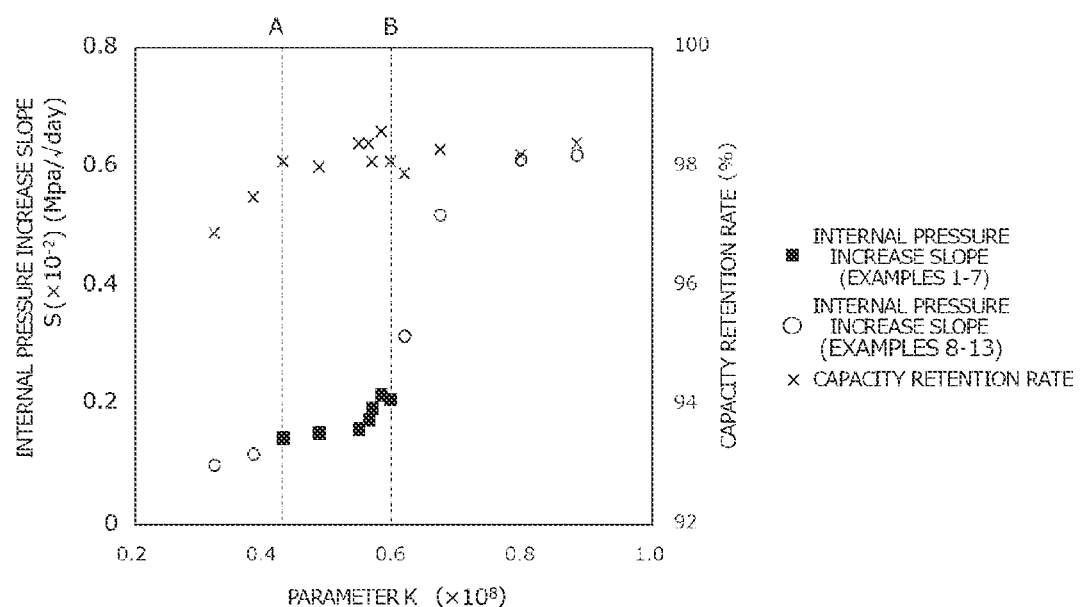
FIG. 5 is a graph showing test results of an Example.

FIG. 5, the marker "■" indicates the internal pressure increase slope S of Examples 1 to 7, the marker "○" indicates the internal pressure increase slope S of Examples 8-13, and the marker "×" indicates the capacity retention rate of each Example. In an area surrounded by dotted lines A and B in FIG. 5 shows a range of the parameter K when each secondary battery was evaluated as having "sufficiently small degree of increase in internal pressure over time" and "high durability performance."

As can be seen from the results shown in Table 1 and FIG. 5, in the secondary batteries (Examples 1 to 7) including an electrode body which includes a positive electrode and a negative electrode, a battery case housing the electrode body, electrode terminals attached to the battery case and in connection with electrodes of the electrode body, and gaskets sandwiched between the battery case and each electrode terminal and sealing between the battery case and each electrode terminal and configured such that a parameter K calculated using the equation (1): $K=Wi/(VrG_{H2})$ satisfies $0.43 \times 10^8$ or more to $0.59 \times 10^8$ or less, the internal pressure increase slope S was $0.25 \times 10^{-2}$ (MPa/√day) or less. In other words, it was demonstrated that the degree of increase in the pressure in such a secondary battery over time was sufficiently reduced. Further, in the secondary batteries for evaluation according to Examples 1 to 7, the capacity retention rate after the storage test was 98.0% or more. In other words, it was demonstrated that improvement in the durability performance was achieved in such a secondary battery. As can be seen from examples using the secondary batteries for evaluation according to Examples 8 to 13, the secondary battery where the parameter K does not satisfy the above-described range did not achieve both the reduction in the degree of increase in the internal pressure over time and the improvement in the durability performance.

As can be seen from the comparison between Examples 1 to 5 and 7 using the battery case A and Example 6 using the battery case B, the secondary battery where the parameter K satisfies the specific range reduced the degree of increase in the internal pressure over time and improved durability performance regardless of the size of the battery case. The internal pressure increase slope S is determined by the difference between gas generated inside the battery case and gas discharged to the outside of the battery case and the volume of gas retained inside the battery case. In other words, the amount (amount of substance) of gas generated inside the battery case increases as the capacity of the secondary battery increases. Further, the amount (amount of

TABLE 1

| Ex. | Parameter K (×10⁸) | Initial Capacity Wi (Ah) | Volume Vr of Void in Case (cm³) | H₂ Gas Permeability Coefficient $G_{H2}$ (×10⁻¹⁰) (cm3·cm)/ (cm²·s·cmHg) | Battery Case | Internal Pressure Increase Slope S (×10⁻²) (Mpa/√day) | Capacity Retention Rate (%) |
|---|---|---|---|---|---|---|---|
| 1 | 0.59 | 4.25 | 20.1 | 35.5 | A | 0.21 | 98.1 |
| 2 | 0.56 | 4.22 | 21.2 | | | 0.18 | 98.4 |
| 3 | 0.48 | 4.20 | 24.4 | | | 0.15 | 98.0 |
| 4 | 0.58 | 4.15 | 13.8 | 51.8 | | 0.22 | 98.6 |
| 5 | 0.55 | 4.13 | 14.6 | | | 0.16 | 98.4 |
| 6 | 0.57 | 4.32 | 21.5 | 35.5 | B | 0.20 | 98.1 |
| 7 | 0.43 | 4.39 | 19.8 | 51.8 | A | 0.15 | 98.1 |
| 8 | 0.88 | 4.23 | 13.5 | 35.5 | | 0.62 | 98.4 |
| 9 | 0.80 | 4.16 | 14.7 | | | 0.61 | 98.2 |
| 10 | 0.67 | 4.05 | 17.0 | | | 0.52 | 98.3 |
| 11 | 0.62 | 4.42 | 20.2 | | B | 0.32 | 97.9 |
| 12 | 0.38 | 4.26 | 21.5 | 51.8 | A | 0.12 | 97.5 |
| 13 | 0.32 | 4.20 | 25.2 | | | 0.10 | 96.9 |

FIG. 5 is a graph showing test results of an Example. In FIG. 5, the vertical axis indicates the internal pressure increase slope S (×10⁻²) (MPa/√day) (the left side in FIG. 5) and the capacity retention rate (%) (the right side in FIG. 5), and the horizontal axis indicates a parameter K (×10⁸). In substance) of gas discharged to the outside of the battery case increases as the transmission coefficient of the gasket increases. The volume of gas retained inside the battery case may change depending on the size of the battery case. The state equation of gas expressed using the amount of substance, the volume, and the pressure (internal pressure) is constant. In order to maintain the volumetric energy density of the secondary battery, the secondary battery is generally developed so that the volume of void in the battery case (i.e., dead space) in the battery case is reduced. Therefore, it is considered that even if the size of the battery case changes, the above-described effect can be obtained when the parameter K satisfies the specific range.

As can be seen from comparison between Examples 5 and 6 and Examples 8 and 9, even if the volume Vr of void in the case is smaller than that in other examples of the present Examples, the parameter K can be in the suitable range by changing the $H_2$ gas permeability coefficient $G_{H2}$ of the gasket used. In other words, it was demonstrated that effective parameter K can be achieved even if the occupied volume of the electrode body in the battery case is increased for higher output (i.e., the volume of void in the base is required to be reduced).

Although specific examples of the technology disclosed herein have been described in detail above, they are mere examples and do not limit the appended claims. The technology described in the appended claims includes various modifications and changes of the foregoing specific examples.

What is claimed is:

1. A secondary battery comprising:
   an electrode body including a positive electrode and a negative electrode;
   a battery case housing the electrode body;
   an electrode terminal attached to the battery case and in connection with the positive electrode or the negative electrode of the electrode body; and
   a gasket sandwiched between the battery case and the electrode terminal and sealing between the battery case and the electrode terminal, wherein
   the secondary battery is configured such that a parameter K calculated using the following equation (1):

$$K = Wi/(Vr \cdot G_{H2}) \qquad (1)$$

(in the equation (1), Wi represents an initial capacity (Ah) of the secondary battery, Vr represents a volume ($cm^3$) of void in the battery case, and $G_{H2}$ represents an $H_2$ gas permeability coefficient ($cm^3 \cdot cm$)/($cm^2 \cdot s \cdot cmHg$) of the gasket at 60° C.) satisfies $0.43 \times 10^8$ or more to $0.59 \times 10^8$ or less.

2. The secondary battery according to claim 1, wherein the $H_2$ gas permeability coefficient $G_{H2}$ ($cm^3 \cdot cm$)/($cm^2 \cdot s \cdot cmHg$) is $35.5 \times 10^{-10}$ or more to $51.8 \times 10^{-10}$ or less.

3. The secondary battery according to claim 1, further comprising a nonaqueous electrolyte including ethylene carbonate, ethyl methyl carbonate, and dimethyl carbonate.

4. A method of manufacturing a secondary battery comprising:
   an electrode body including a positive electrode and a negative electrode;
   a battery case housing the electrode body;
   an electrode terminal attached to the battery case; and
   a gasket sandwiched between the battery case and the electrode terminal and sealing between the battery case and the electrode terminal, the method comprising:
   setting a parameter K calculated using the following equation (1):

$$K = Wi/(Vr \cdot G_{H2}) \qquad (1)$$

(in the equation (1), Wi represents an initial capacity (Ah) of the secondary battery, Vr represents a volume ($cm^3$) of void in the battery case, and $G_{H2}$ represents an $H_2$ gas permeability coefficient ($cm^3 \cdot cm$)/($cm^2 \cdot s \cdot cmHg$) of the gasket at 60° C.) to satisfy $0.43 \times 10^8$ or more to $0.59 \times 10^8$ or less to construct the secondary battery.

5. The method according to claim 4, wherein the setting is performed with a gasket having the $H_2$ gas permeability coefficient $G_{H2}$ ($cm^3 \cdot cm$)/($cm^2 \cdot s \cdot cmHg$) of $35.5 \times 10^{-10}$ or more to $51.8 \times 10^{-10}$ or less selected as the gasket.

6. The method according to claim 4, further comprising: injecting a nonaqueous electrolyte including ethylene carbonate, ethyl methyl carbonate, and dimethyl carbonate.

* * * * *